UNITED STATES PATENT OFFICE.

HUGO SCHWEITZER AND ARTHUR ZART, OF ELBERFELD, GERMANY, ASSIGNORS TO FARBENFABRIKEN VORM. FRIEDR. BAYER & CO., OF ELBERFELD, GERMANY, A CORPORATION OF GERMANY.

POLYAZO DYES.

1,038,209.  Specification of Letters Patent.  Patented Sept. 10, 1912.

No Drawing.  Application filed December 9, 1911. Serial No. 664,859. REISSUED

*To all whom it may concern:*

Be it known that we, HUGO SCHWEITZER and ARTHUR ZART, doctors of philosophy, chemists, citizens of the German Empire, residing at Elberfeld, Germany, have invented new and useful Improvements in Polyazo Dyes, of which the following is a specification.

The present invention relates to the manufacture and production of new azo coloring matters having most probably the formula:

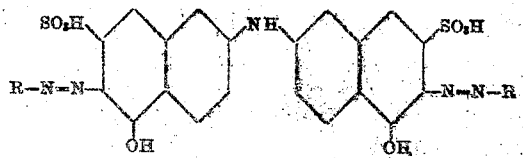

R meaning an azo compound being free from an oxy and amino group.

The new dyes are obtained by combining the diazo compounds prepared from an aminoazo compound containing besides the one amino group no other amino or oxy groups with the 5.5'-dioxy-2.2'-dinaphthylamin-7.7'-disulfonic acid:

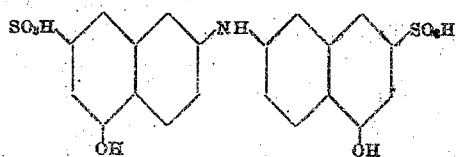

The new dyes are after being dried and pulverized in the shape of their alkaline salts dark powders soluble in water; yielding upon reduction with stannous chlorid and hydrochloric acid an aromatic amin, a diamin and a compound of the formula:

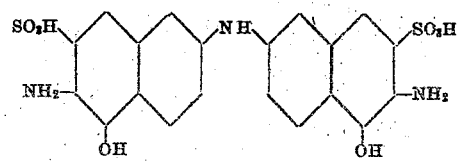

dyeing cotton from violet to greenish-blue shades which on being developed with diazotized para-nitranilin change into shades fast to washing and capable of being discharged to a pure white.

The following example may further illustrate the invention, the parts being by weight:— 904 parts (2 mol.) of the monoazo dye: para-nitro-ortho-sulfobenzene-azo-1-naphthylamin-7-sulfonic acid are diazotized with 138 parts of sodium nitrite and hydrochloric acid and combined with 461 parts of the 5.5'-dioxy-2.2'-dinaphthylamin-7.7'-disulfonic acid containing an excess of sodium bicarbonate. The mixture is heated and the dye is salted out with common salt, filtered off and dried.

The new dye having most probably the formula:

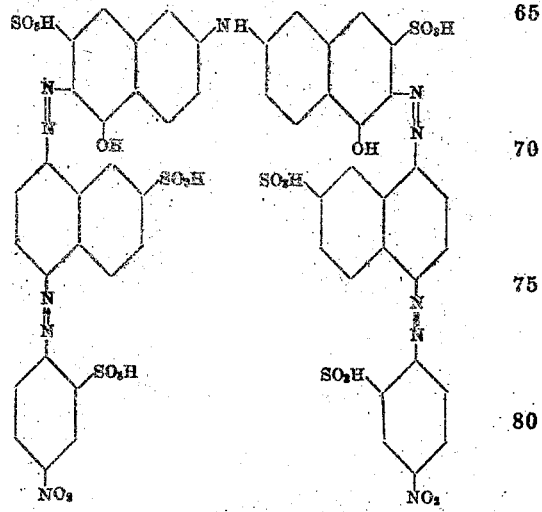

is in the shape of its sodium salt a dark powder which is easily soluble in water with a blue coloration and which is soluble in concentrated sulfuric acid with a green coloration. Upon reduction with stannous chlorid and hydrochloric acid it is split up into 6.6'-diamino-5.5'-dioxy-2.2'-dinaphthylamin-7.7'-disulfonic acid, 1.4-naphthylenediamin-7-sulfonic acid and para-phenylenediamin sulfonic acid. It dyes cotton greenish-blue. The shade after being developed with diazotized para-nitranilin is greenish-blue fast to washing. It can be discharged to a pure white.

Other aminoazo compounds may be used e. g. such obtained from anilin, para-chloro-anilin-ortho-sulfonic acid, meta-xylidin-ortho-sulfonic acid, 2-naphthylamin-4.8-disulfonic acid on the one hand and 1-naphthylamin-6-sulfonic acid, anilin, ortho- or meta-toluidin, paraxylidin, cresidin, alpha-naphthylamin on the other hand.

We claim:—

1. The herein described new azo dyestuffs having most probably the formula:

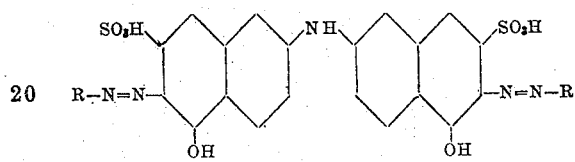

R meaning an azo compound being free from amino and oxy groups which are after being dried and pulverized in the shape of their alkaline salts dark powders soluble in water: yielding upon reduction with stannous chlorid and hydrochloric acid an aromatic amin, a diamin and a compound of the formula:

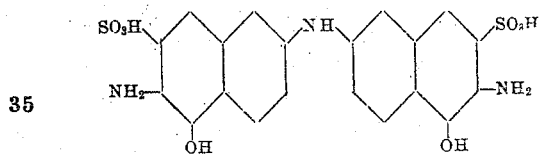

dyeing cotton from violet to greenish-blue shades which on being developed with diazotized para-nitranilin change into shades fast to washing and capable of being discharged to a pure white, substantially as described.

2. The herein described new dye having most probably the formula:

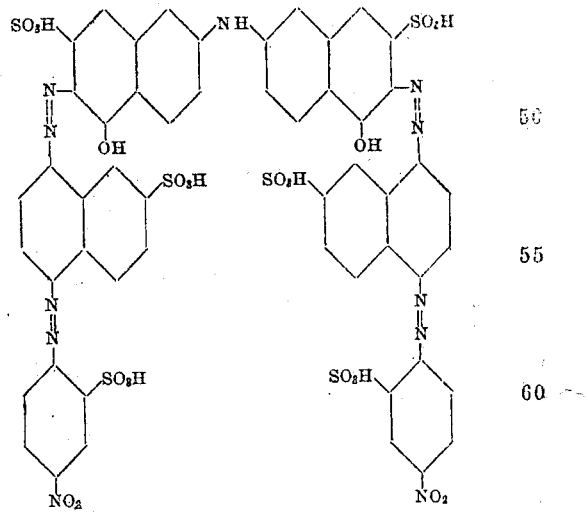

which is after being dried and pulverized in the shape of its sodium salt a dark powder soluble in concentrated sulfuric acid with a greenish-blue coloration; yielding upon reduction with stannous chlorid and hydrochloric acid 6.6'-diamino-5.5'-dioxy-2.2'-dinaphthylamin-7.7'-disulfonic acid, para-phenylenediamin sulfonic acid and 1.4-naphthylenediamin-7-sulfonic acid; dyeing cotton greenish-blue, which shade after being developed with diazotized para-nitranilin is bluish-violet fast to washing which can be discharged to a pure white, substantially as described.

In testimony whereof we have hereunto set our hands in the presence of two subscribing witnesses.

HUGO SCHWEITZER. [L. S.]
ARTHUR ZART. [L. S.]

Witnesses:
HELEN NUFER,
A. NUFER.